United States Patent
Kironn et al.

(10) Patent No.: US 10,344,678 B2
(45) Date of Patent: Jul. 9, 2019

(54) ADDITIVE MANUFACTURED NON-ROUND, SEPTUM TIED, CONFORMAL HIGH PRESSURE TUBING

(71) Applicant: United Technologies Corporation, Farmington, CT (US)

(72) Inventors: Lexia Kironn, Rocky Hill, CT (US); Wendell V. Twelves, Glastonbury, CT (US); Evan Butcher, Windsor Locks, CT (US); Gary Schirtzinger, Glastonbury, CT (US); Joe Ott, Enfield, CT (US)

(73) Assignee: United Technologies Corporation, Farmington, CT (US)

( * ) Notice: Subject to any disclaimer, the term of this patent is extended or adjusted under 35 U.S.C. 154(b) by 414 days.

(21) Appl. No.: 15/112,468

(22) PCT Filed: Jan. 20, 2015

(86) PCT No.: PCT/US2015/012070
§ 371 (c)(1),
(2) Date: Jul. 19, 2016

(87) PCT Pub. No.: WO2015/160403
PCT Pub. Date: Oct. 22, 2015

(65) Prior Publication Data
US 2016/0333790 A1   Nov. 17, 2016

Related U.S. Application Data

(60) Provisional application No. 61/929,325, filed on Jan. 20, 2014.

(51) Int. Cl.
*F01D 25/24* (2006.01)
*F02C 7/27* (2006.01)
*F04D 29/52* (2006.01)

(52) U.S. Cl.
CPC ............... *F02C 7/27* (2013.01); *F01D 25/24* (2013.01); *F04D 29/522* (2013.01);
(Continued)

(58) Field of Classification Search
CPC ............... F01D 25/24; F05D 2260/606; F17C 2201/0152
See application file for complete search history.

(56) References Cited

U.S. PATENT DOCUMENTS 2,686,631 A * 8/1954 Jordan ................. F02C 7/04
  415/116
2,920,784 A * 1/1960 Boardman ............ F17C 1/08
  220/501

(Continued)

FOREIGN PATENT DOCUMENTS

KR   20030059428   7/2003

OTHER PUBLICATIONS

Extended EP Search Report dated Jan. 12, 2017.
Office action for EP15779881.0 dated Dec. 13, 2017.

*Primary Examiner* — Ninh H. Nguyen
(74) *Attorney, Agent, or Firm* — O'Shea Getz P.C.

(57) ABSTRACT

A septum-tied tube pack is provided that includes a first outer wall formed by a multiple of first connected radiuses. A second outer wall is formed by a multiple of second connected radiuses. A first end radius connects the first outer wall and the second outer wall. A second end radius connects the first outer wall and the second outer wall. A multiple of septum elements extend between the first outer wall and the second outer wall. A gas turbine engine is also provided that includes an engine case structure and a fluid conduit mounted to the engine case structure. The fluid conduit includes a septum-tied tube pack section.

17 Claims, 10 Drawing Sheets

(52) U.S. Cl.
CPC ...... *F05D 2220/50* (2013.01); *F05D 2230/31* (2013.01); *F05D 2250/141* (2013.01); *F05D 2250/191* (2013.01); *F05D 2250/75* (2013.01); *F17C 2201/0152* (2013.01); *Y02T 50/671* (2013.01)

(56) References Cited

U.S. PATENT DOCUMENTS

| | | | |
|---|---|---|---|
| 4,182,254 A * | 1/1980 | Secord | B63B 25/08 |
| | | | 114/74 A |
| 4,946,056 A * | 8/1990 | Stannard | B65D 90/02 |
| | | | 220/501 |
| 5,165,232 A | 11/1992 | Amelio et al. | |
| 5,577,630 A * | 11/1996 | Blair | B60K 15/03006 |
| | | | 220/23.2 |
| 5,787,920 A | 8/1998 | Krasnov | |
| 6,095,367 A | 8/2000 | Blair et al. | |
| 6,185,957 B1 | 2/2001 | Voss et al. | |
| 6,412,650 B1 * | 7/2002 | Warner | F17C 1/08 |
| | | | 220/4.12 |
| 6,551,056 B2 | 4/2003 | Rau | |
| 6,773,225 B2 | 8/2004 | Yuri et al. | |
| 6,787,947 B2 | 9/2004 | Coulon et al. | |
| 6,837,676 B2 | 1/2005 | Yuri et al. | |
| 6,886,325 B2 | 5/2005 | Norris et al. | |
| 7,078,497 B2 | 7/2006 | Kaser et al. | |
| 7,625,171 B2 | 12/2009 | Maguire et al. | |
| 7,874,799 B2 | 1/2011 | Young et al. | |
| 8,408,868 B2 | 4/2013 | Hatman | |
| 8,517,666 B2 | 8/2013 | Alvanos et al. | |
| 2004/0247429 A1 | 12/2004 | Arilla et al. | |
| 2006/0005546 A1 | 1/2006 | Orlando et al. | |
| 2007/0000550 A1 | 1/2007 | Osinski | |
| 2007/0246461 A1 | 10/2007 | Shimada et al. | |
| 2014/0013756 A1 | 1/2014 | Melton et al. | |

* cited by examiner

ADDITIVE MANUFACTURED NON-ROUND, SEPTUM TIED, CONFORMAL HIGH PRESSURE TUBING

CROSS-REFERENCE TO RELATED APPLICATION

This application claims priority to PCT Patent Application No. PCT/US2015/012070 filed Jan. 20, 2015, which claims priority to U.S. Provisional Patent Application No. 61/929,325 filed Jan. 20, 2014, which are hereby incorporated herein by reference in their entireties.

BACKGROUND

The present disclosure relates to tubing and, more particularly, to high pressure tubing for a gas turbine engine.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

External fittings for gas turbine engines are often constrained by the available envelope be they a nacelle, fuselage or other structure. Ducting of low-pressure fluids can be accomplished with non-round conduits, but high-pressure fluids demand round tubing to minimize weight through utilization of the principle of tension hoop stress. The constrained envelope often requires that designers resort to multiple small diameter tubes to carry the desired flow rates. This results in additional connections, each of which may be a potential source of leakage and requires time for assembly, inspection, and testing. Vacuum chambers are also designed with circular cross sections to uniformly load the chambers walls in compression.

SUMMARY

A septum-tied tube pack, according to one disclosed non-limiting embodiment of the present disclosure, includes a first outer wall formed by a multiple of first connected radiuses. A second outer wall is formed by a multiple of second connected radiuses. A first end radius connects the first outer wall and the second outer wall. A second end radius connects the first outer wall and the second outer wall. A multiple of septum elements extend between the first outer wall and the second outer wall.

In a further embodiment of the present disclosure, each of the multiple of septum elements extend tangentially with respect to the multiple of first connected radiuses and the multiple of second connected radiuses.

In a further embodiment of the present disclosure, the multiple of septum elements are generally flat walls.

In a further embodiment of the present disclosure, each of the multiple of septum elements includes at least one opening therethrough.

In a further embodiment of the present disclosure, each of the multiple of septum elements is perforated.

In a further embodiment of the present disclosure, the multiple of septum elements are maintained in tension when the septum-tied tube pack is under a positive pressure loads.

In a further embodiment of the present disclosure, the first outer wall, the second outer wall, the first end radius, the second end radius of the multiple of septum elements are maintained in tension when the septum-tied tube pack is under a positive pressure loads.

In a further embodiment of the present disclosure, the multiple of septum elements are maintained in compression when the septum-tied tube pack is under a negative pressure load.

In a further embodiment of the present disclosure, at least one of the first end radius and/or the second end radius form an outer passage that is generally "D" shaped in cross-section.

In a further embodiment of the present disclosure, the outer passage forms a hemi-circle with a center located at a mid-point of an end septum element.

In a further embodiment of the present disclosure, the first outer wall, the second outer wall and the multiple of septum elements define at least one inner passage that is racetrack shaped in cross section.

In a further embodiment of the present disclosure, an intermediate passage is located between the outer passage and an adjacent inner passage.

In a further embodiment of the present disclosure, the intermediate passage is about one-half of the inner passages.

In a further embodiment of the present disclosure, the first outer wall, the second outer wall, the first end radius and the second end radius terminate with a transition section that forms a round interface section.

In a further embodiment of the present disclosure, the first outer wall, the second outer wall, the first end radius and the second end radius terminate with a closed end.

A gas turbine engine, according to another disclosed non-limiting embodiment of the present disclosure, includes an engine case structure and a fluid conduit mounted to the engine case structure. The fluid conduit includes a septum-tied tube pack section.

In a further embodiment of the present disclosure, a round segment is connected to the septum-tied tube pack section.

In a further embodiment of the present disclosure, the septum-tied tube pack section forms a tank.

In a further embodiment of the present disclosure, the septum-tied tube pack section is located at a "pinch point".

In a further embodiment of the present disclosure, the septum-tied tube pack section is additive manufactured.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment(s). The components in the drawings are not necessarily to scale. Moreover, in the drawings, like reference numerals designate corresponding parts throughout the several views. The drawings that accompany the detailed description can be briefly described as follows.

DETAILED DESCRIPTION

Figure 1:
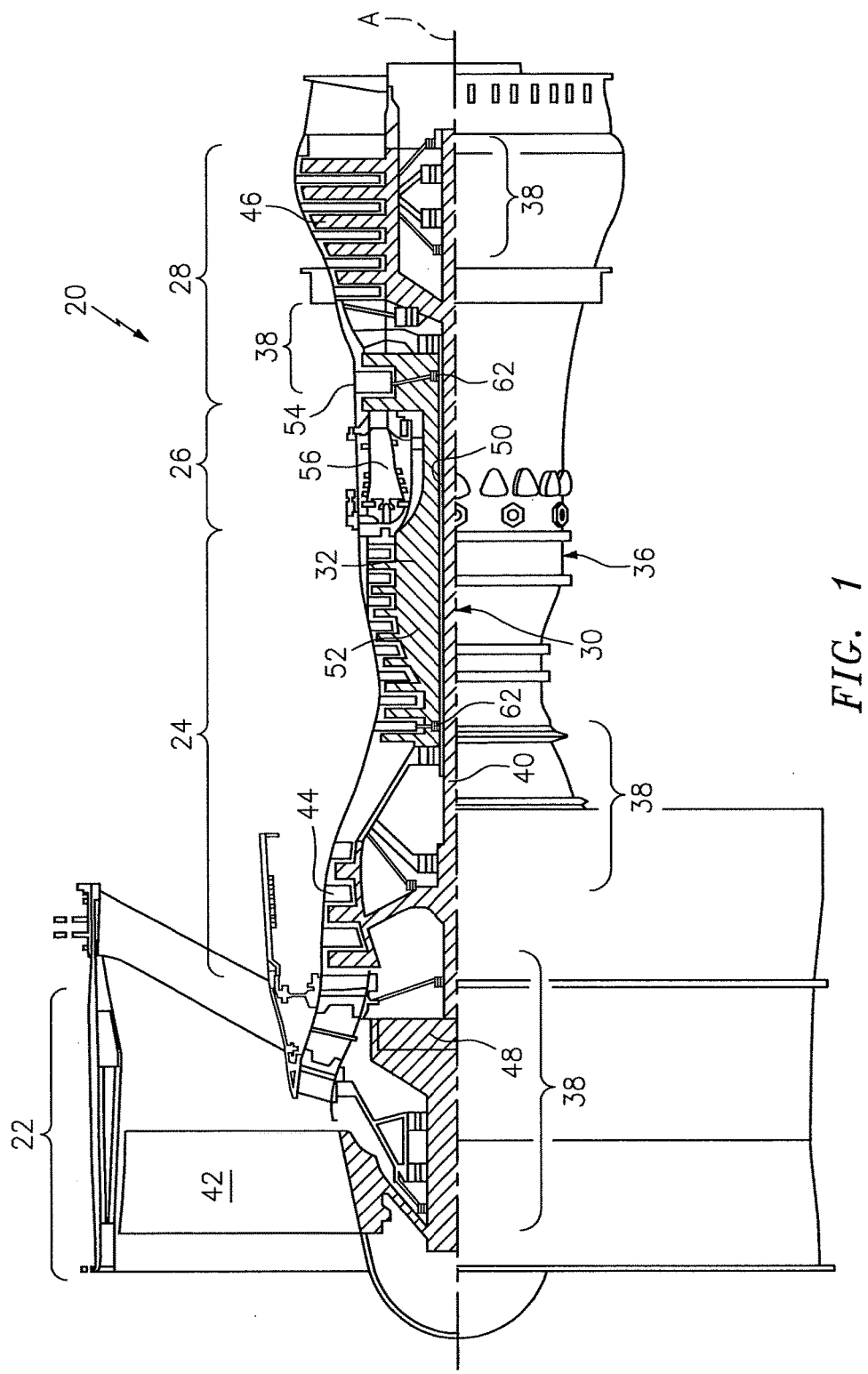
FIG. 1 is a schematic cross-section of an example gas turbine engine architecture.
Figure 2:
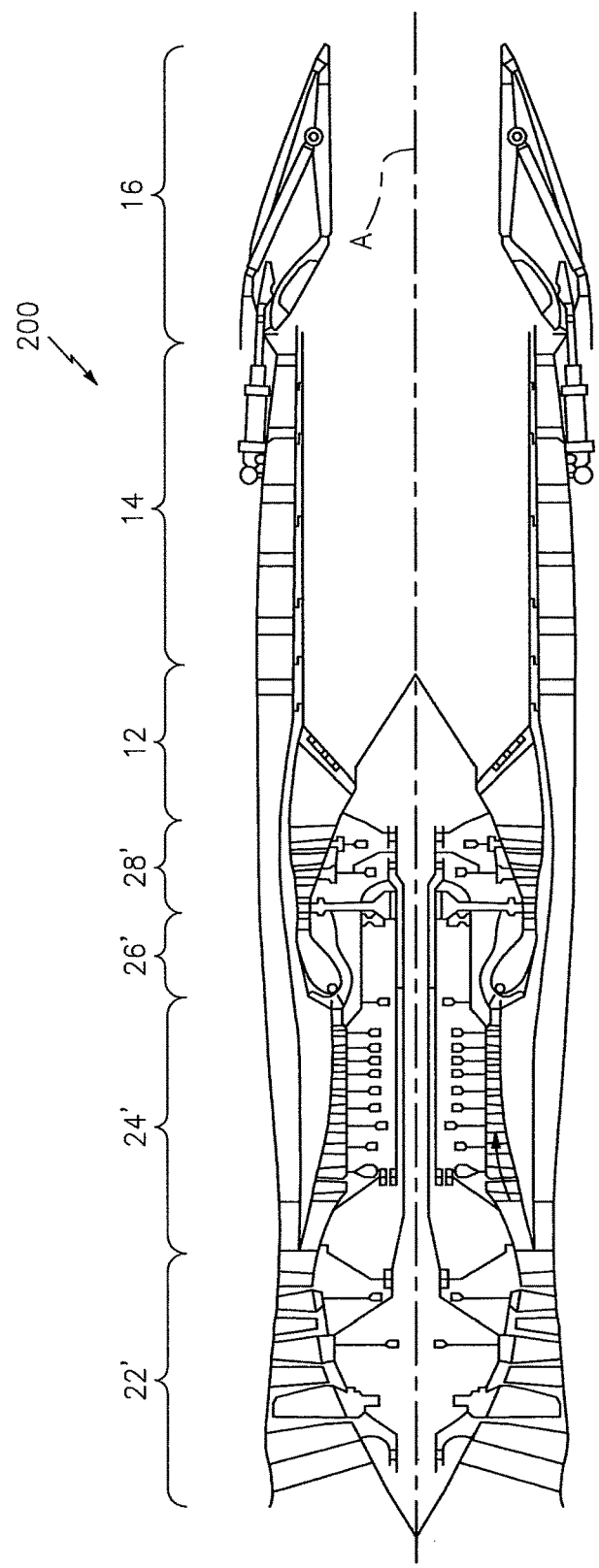
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures 200 might include an augmentor section 12, an exhaust duct section 14 and a nozzle section 16 in addition to the fan section 22', compressor section 24', combustor section 26' and turbine section 28' (see FIG. 2) among other systems or features. The fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an Intermediate Pressure Compressor ("IPC") between a Low Pressure Compressor ("LPC") and a High Pressure Compressor ("HPC"), and an Intermediate Pressure Turbine ("IPT") between a High Pressure Turbine ("HPT") and a Low Pressure Turbine ("LPT").

The engine 20 generally includes a low spool 30 and a high spool 32 mounted for rotation about an engine central longitudinal axis A relative to an engine case structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion. The main engine shafts 40, 50 are supported at a plurality of points by the bearing structures 38 within the static structure 36.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 3:
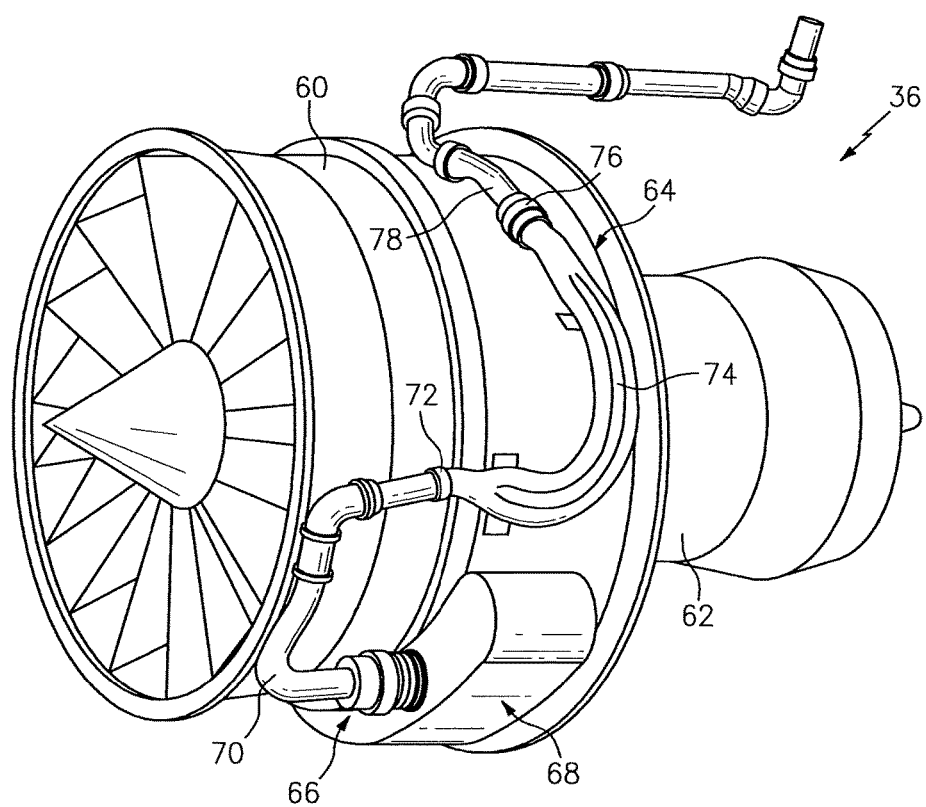
FIG. 3 is a schematic view of the example gas turbine engine of FIG. 1 with an example high pressure fluid conduit according to one disclosed non-limiting embodiment.
Figure 4:
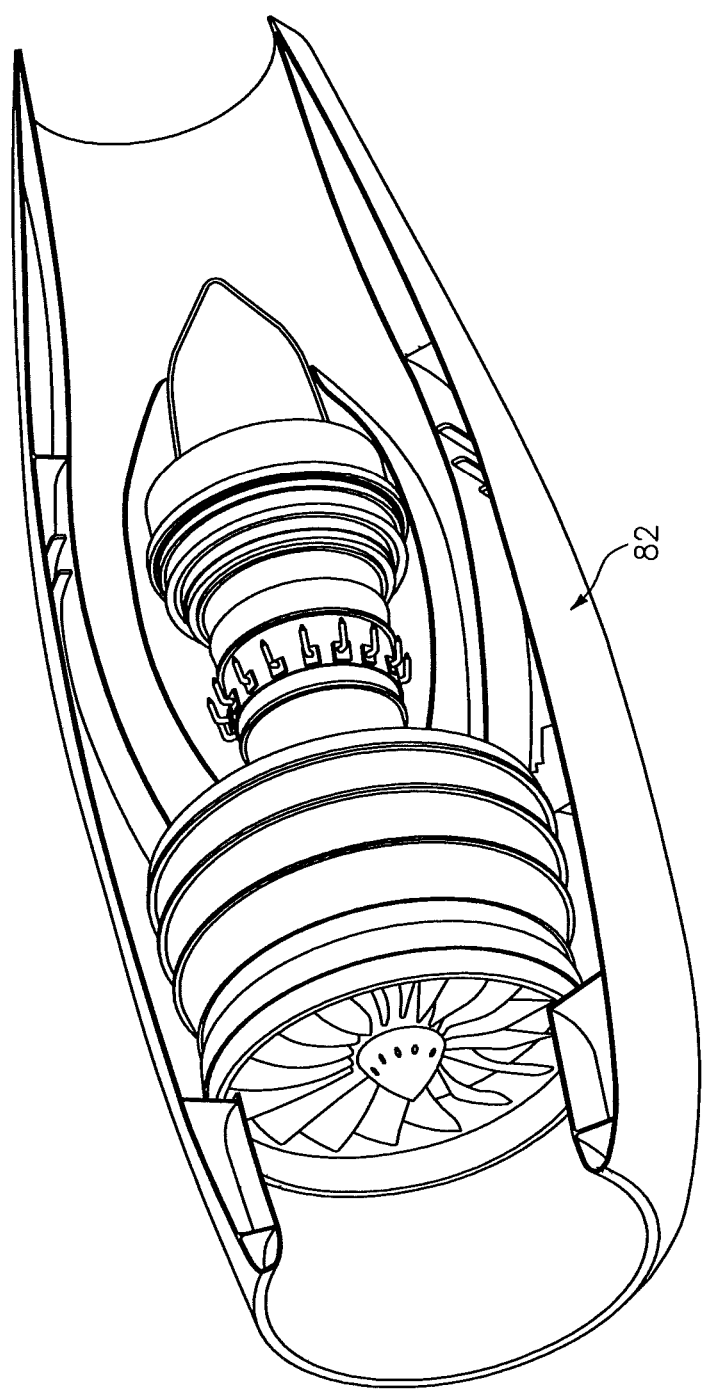
FIG. 4 is a schematic view of the example gas turbine engine of FIG. 3 within an example nacelle structure which may define a "pinch point"

With reference to FIG. 3, the engine case structure 36 generally includes a fan case structure 60 and a core case structure 62 mounted to the fan case structure 60. A fluid conduit 64, e.g., a high pressure air duct, is at least partially mounted to the engine case structure 36 to communicate the high pressure air from, for example, a cross-feed from another engine, from an auxiliary power unit (APU) or from a ground supply to an engine air starter 66 operable to drive an engine external gear box 68.

In one disclosed non-limiting embodiment, the fluid conduit 64 may be a multi-segment conduit that incorporates a first round segment 70, a first fitting 72, a septum-tied tube pack 74, a second fitting 76 and a second round segment 78. It should be appreciated that various additional or alternative segments and/or fittings may also be provided. The septum-tied tube pack 74 reduces the overall profile of the engine to facilitate low profile geometries that conform to a non-planar envelope between an outer surface of the engine case structure 36 and an envelope limit or "pinch point" often formed by a structure 82 such as an engine nacelle (see FIG.

4), fuselage or other confinement restriction which may thereby be reduced in size, to promote aerodynamic efficiency and decrease weight. That is, the septum-tied tube pack 74 provides a low weight, high pressure, non-round tube or pressure vessel with the appropriate radius blending of the outside mold line to follow a desired twisting, serpentine path in three dimensions.

The septum-tied tube pack 74 may be readily manufactured with an additive manufacturing process that includes, but is not limited to, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD) and/or Laser Powder Bed Fusion (LPBF).

The additive manufacturing process sequentially builds-up layers of atomized alloy and/or ceramic powder material that include, but are not limited to, 625 Alloy, 718 Alloy, 230 Alloy, stainless steel, tool steel, cobalt chrome, titanium, nickel, aluminum and others in atomized powder material form. Alloys such as 625, 718 and 230 may have specific benefit for parts that operate in high temperature environments such as, for example, environments typically encountered by aerospace and gas turbine engine components.

The additive manufacturing process facilitates manufacture of the relatively complex internal geometry to minimize assembly details and multi-component construction. The additive manufacturing process fabricates or "grows" of components using three-dimensional information, for example a three-dimensional computer model. The three-dimensional information is converted into a plurality of slices, each slice defining a cross section of the component for a predetermined height of the slice. The additive manufactured component 140 is then "grown" slice by slice, or layer by layer, until finished. Each layer has an example size between about 0.0005-0.001 inches (0.0127-0.0254 mm) Although particular additive manufacturing processes are disclosed, those skilled in the art of manufacturing will recognize that any other suitable rapid manufacturing methods using layer-by-layer construction or additive fabrication can alternatively be used.

Figure 5:
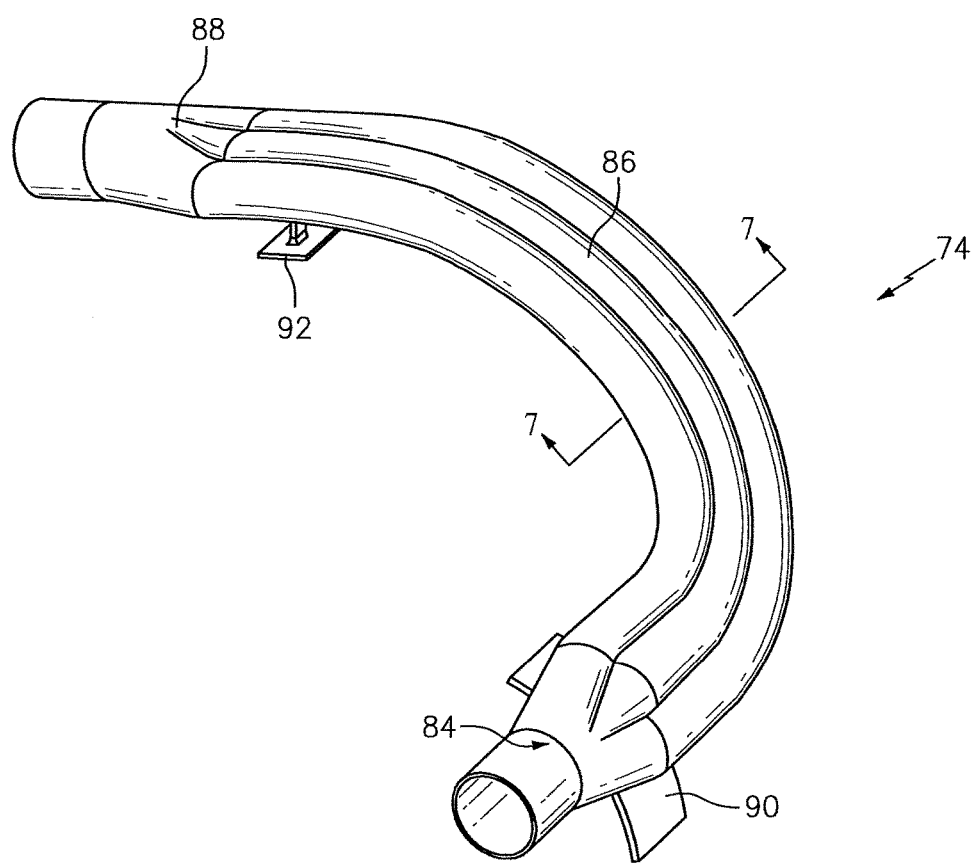
FIG. 5 is an outer schematic view of a septum-tied tube pack section according to one disclosed non-limiting embodiment.
Figure 6:
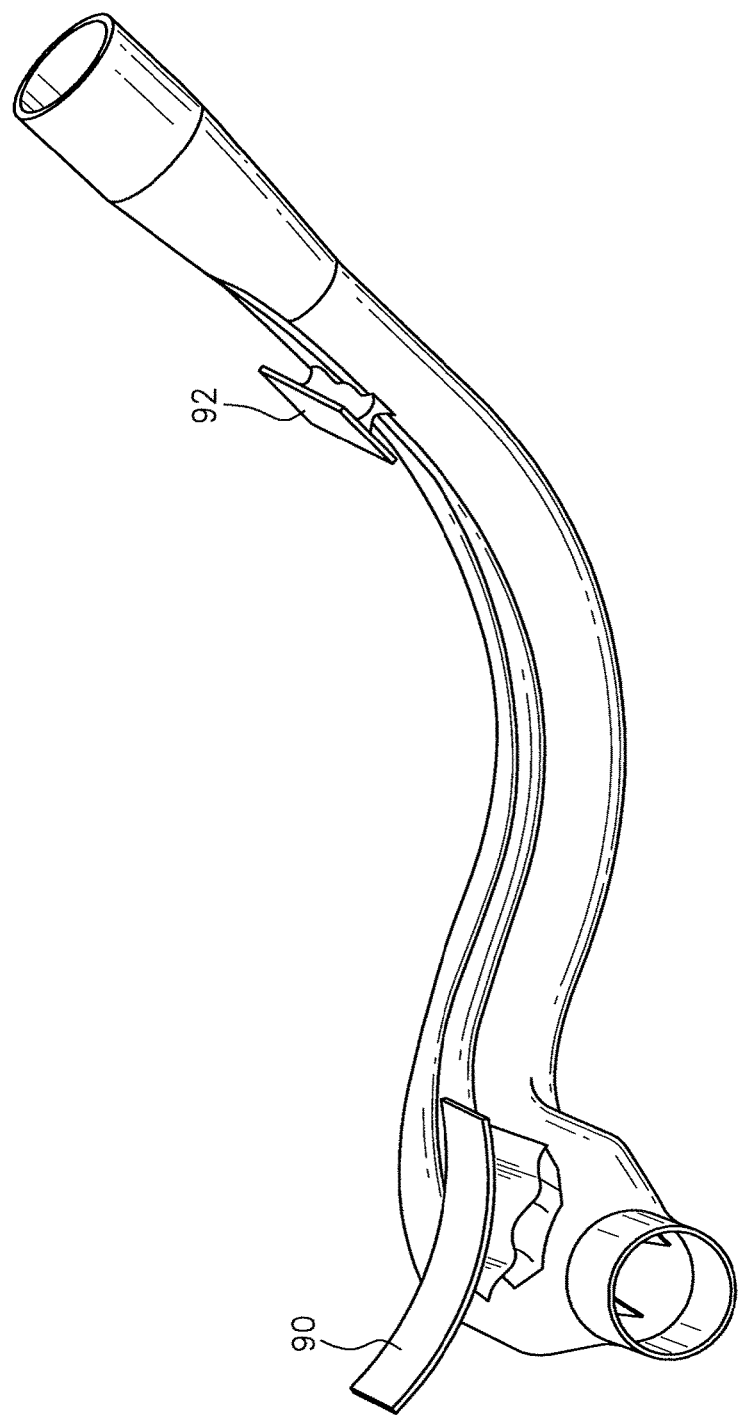
FIG. 6 is an inner schematic view of the septum-tied tube pack section.

With reference to FIG. 5, the septum-tied tube pack 74 according to one disclosed non-limiting embodiment includes a first transition section 84, a septum-tied tube pack section 86 and a second transition section 88. A multiple of mounts 90, 92 (also shown in FIG. 6) may be extend from the septum-tied tube pack 74 to facilitate removable attachment to, for example the engine case structure 36 (see FIG. 3). It should be appreciated that various geometries will benefit herefrom.

Figure 7:
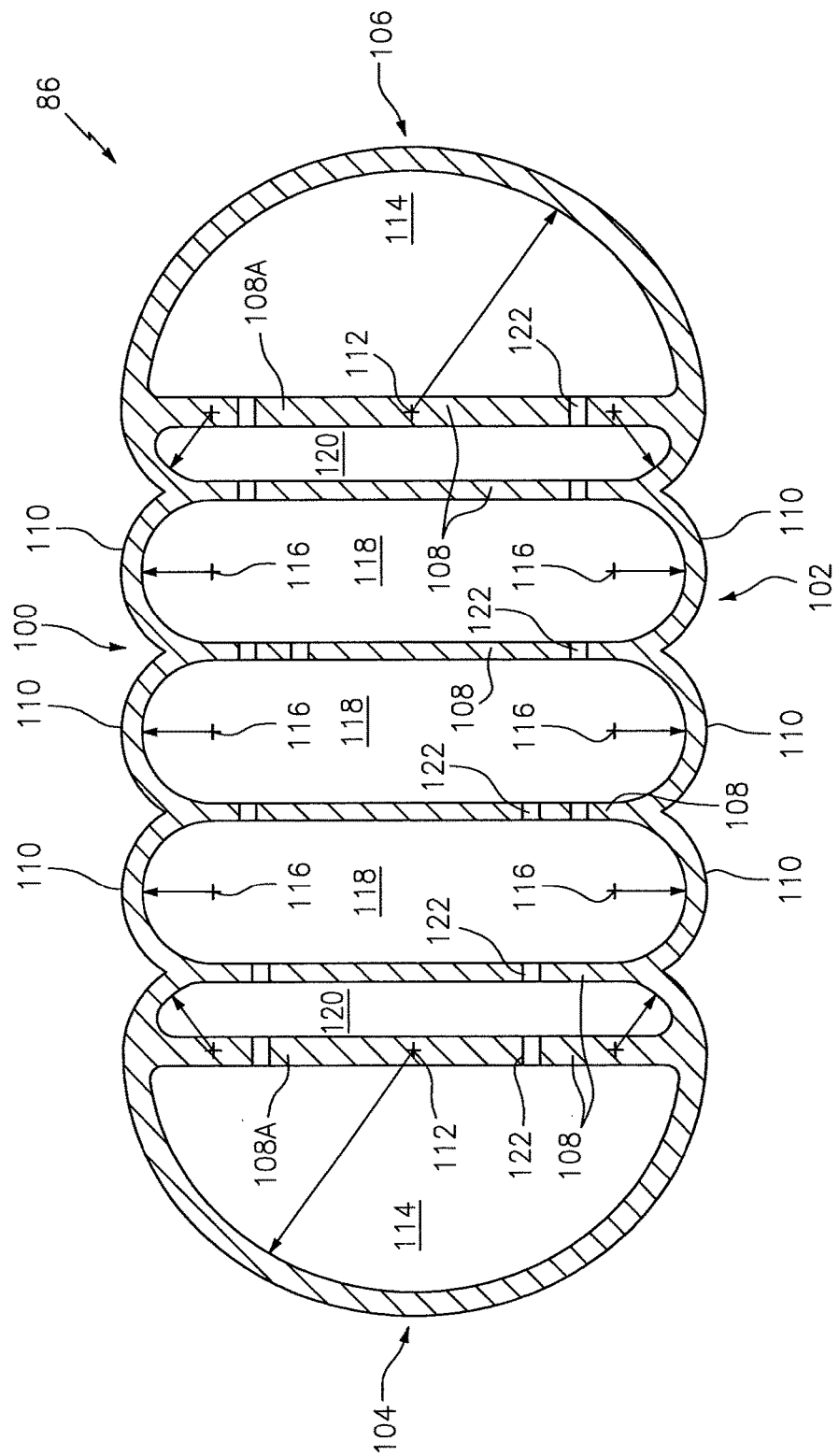
FIG. 7 is a cross-section of the septum-tied tube pack section according to one disclosed non-limiting embodiment.

With reference to FIG. 7, according to one disclosed non-limiting embodiment, the septum-tied tube pack section 86 forms a cross-section with a first outer wall 100 and a second outer wall 102 connected by a first end radius 104, a second end radius 106 and a multiple of septum elements 108. The first outer wall 100 and the second outer wall 102 are formed by a multiple of connected radiuses 110 each connected by a respective septum element 108 which extends tangentially therefrom.

The first end radius 104 and the second end radius 106 essentially forms a hemi-circle with a center 110 located at a mid-point 112 of an end septum element 108A to form an outer passage 114 that is generally "D" shaped in cross-section. Each of the multiple of connected radiuses 110 also essentially form a respective hemi-circle with a center 116 to form an inner passage 118 (three shown) that is generally racetrack shaped in cross-section. An intermediate passage 120 located between each outer passage 114 and the next adjacent inner passage 118 is essentially one-half of the inner passages 118 such that the walls of the septum-tied tube pack section 86 maintain tension and hoop stress loading in a low profile, non-round shape. That is, the septum elements 108 operate as tie-rods when the septum-tied tube pack section 86 is pressurized or are maintained in compression when a lower-than-ambient pressure is present within the septum-tied tube pack section 86. Positive pressure vessels may be constructed of a metal alloy or reinforced ceramics capable of sustaining tension loads while negative pressure vessels that load the structure in compression may be constructed of metal alloys or ceramic materials.

It should be appreciated that each of the multiple of septum elements 108 may be of various thicknesses such that each of the multiple of septum elements 108 are specifically tailored for the loads that are to be carried thereby. For example, the end septum elements 108A may be relatively thicker than the other multiple of septum elements 108. Additionally, the septum elements 108 may include openings 122 or be otherwise perforated or open to assure a pressure balance on both sides of the relatively flat septum elements n. In other words, all of the passages 114, 118, 120 are open one to another.

Figure 8:
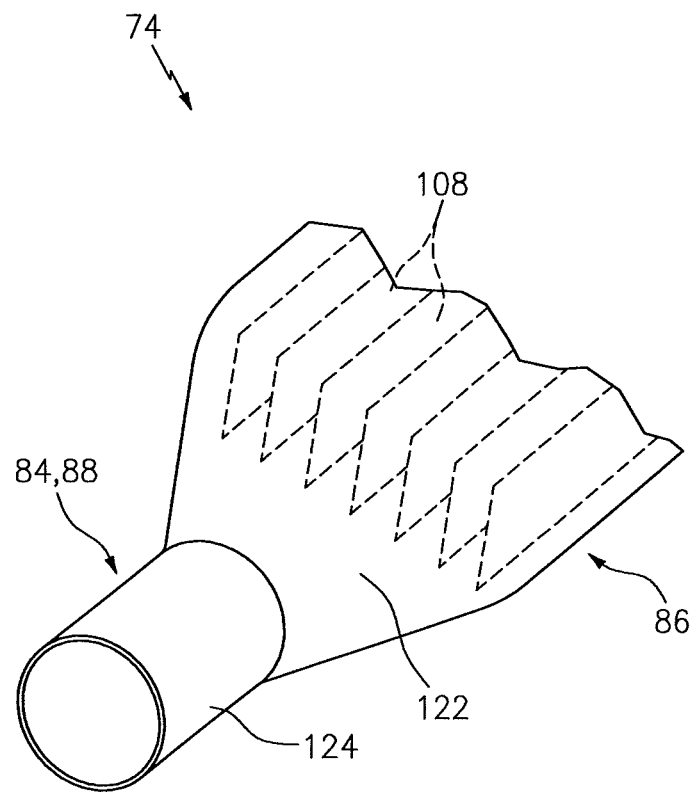
FIG. 8 is an expanded partial phantom view of a transition section to facilitate attachment of the septum-tied tube pack to a round segment.

With reference to FIG. 8, the septum-tied tube pack section 86 terminates with the first transition section 84 and the second transition section 88 to facilitate attachment of the septum-tied tube pack 74 to the respective first round segment 70 and second round segment 78 via the first fitting 72 and the second fitting 76 (see FIG. 3). The first transition section 84 and the second transition section 88 may permit the septum elements 108 to extend into an open plenum 122 which combines all of the passages 114, 118, 120 to a round interface section 124 (see FIG. 8). It should be appreciated that various structures that combines the passages 114, 118, 120 of the septum-tied tube pack section 86 may alternatively be provided.

In one dimensional example, the septum-tied tube pack section 86 provides equivalent flow area to a 2.4 inch (61 mm) diameter flow conduit in an about 1.6 inch (40.6 mm) tall and about 4.5 inch (114.3 mm) wide package. That is, the septum-tied tube pack section 86 provides a relatively flat geometry with a flow area equivalent to a round flow conduit without otherwise compromising the pressure capability. It should be appreciated that the cross-section of the septum-tied tube pack section 86 and the number of the septum elements 108 therein may be optimized to provide the maximum flow area with the minimal blockage. In other words, for a given flow area an optimized height and width with a related number of the septum elements 108 may be determined, however, the dimension may be further selected with respect to external factors such as available packaging area.

Figure 9:
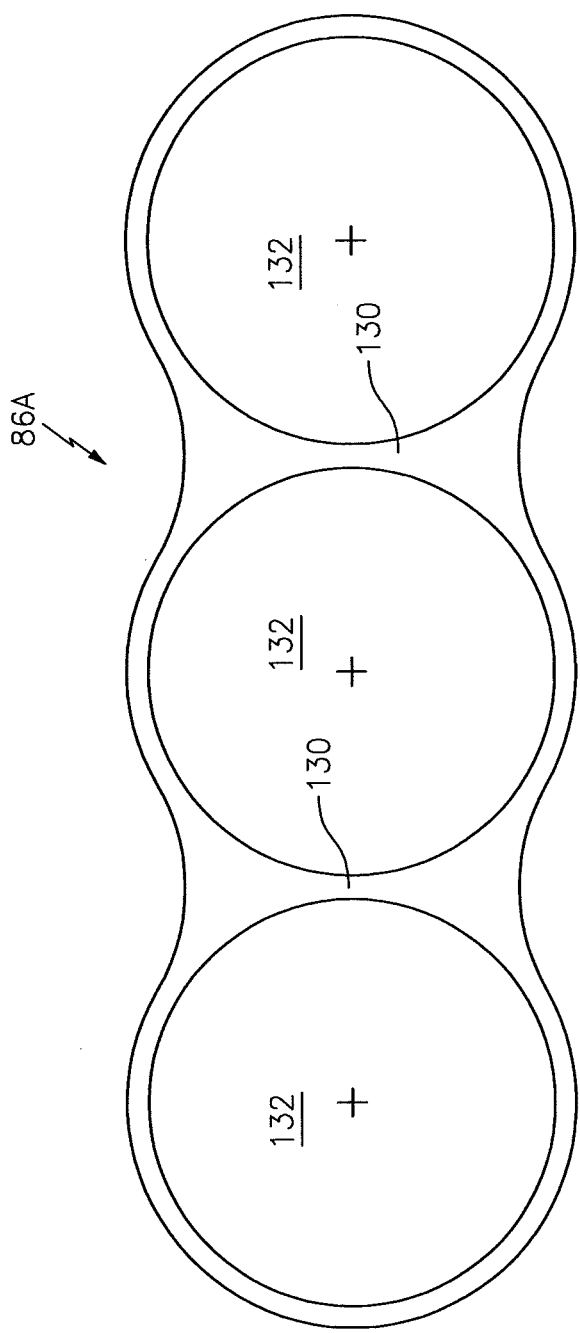
FIG. 9 is a cross-section of the septum-tied tube pack section according to another disclosed non-limiting embodiment.

With reference to FIG. 9, in another disclosed non-limiting embodiment, a septum-tied tube pack section 86A includes relatively short or even zero length septum elements 130 such that all of the passages 132 are generally circular in cross-section. The septum-tied tube pack section 86A provides another geometry that may be relatively wider than the above-discussed geometry but includes relatively less numerous septum elements 130 for a comparable flow capacity.

Figure 10:
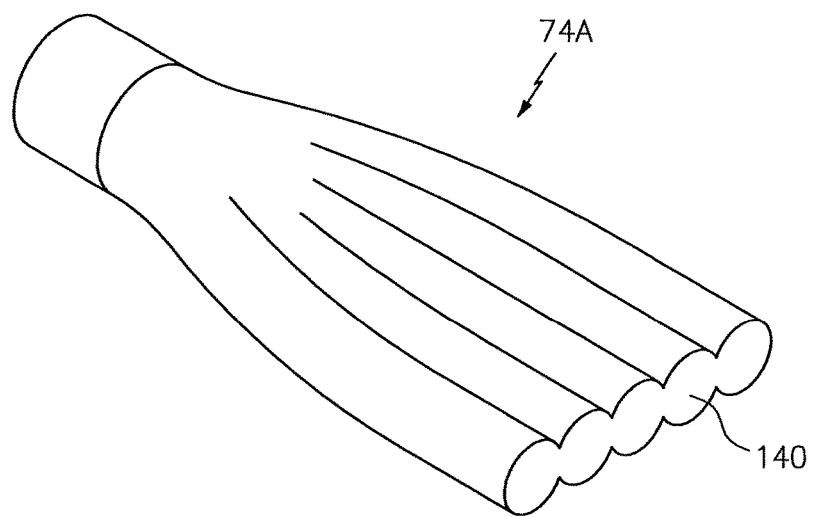
FIG. 10 is a cross-section of the septum-tied tube pack section in a tank embodiment.

With reference to FIG. 10, in another disclosed non-limiting embodiment, a septum-tied tube pack 74A includes a closed end 140 to form a conformal tank. That is, the septum-tied tube pack 74A may be utilized to contain fluid under pressure in heretofore unavailable spaces typical of an engine nacelle. The closed end 140 may be of various configurations such as a rib-reinforced structure, a contoured structure (shown) or other geometry dependent on various factors such as weight requirements, cost, etc.

The septum-tied tube pack configuration provides non-round tubes, tanks, chambers, and vessels capable of carrying high pressure or resisting negative pressure loads within a low profile, conformal design that retain the advantage of minimal weight. In applications where space is restricted, this septum-tied tube pack configuration enables more efficient packaging. In turbine engine applications, the envelope required for external tanks and plumbing can be reduced to enable a relatively smaller diameter engine. Where needed, a fitting using this geometry enables relatively large diameter tubes to pass full flow through an envelope pinch point, such as between an engine case and an airframe bulkhead. Part count reduction and the number of connections with leakage potential are also be reduced.

The septum-tied tube pack configuration is also readily applicable to various other industries. Potential product applications include, but are not limited to, lower profile, conformal scuba tanks, rescue breathing tanks for firefighters, deep diving submersible vessels, vacuum chambers, pipe lines, boilers, and/or other applications where packaging can be improved by a non-round pressure vessel or vacuum chamber.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A septum-tied tube pack, comprising:
   a first outer wall formed by a multiple of first connected radiuses;
   a second outer wall formed by a multiple of second connected radiuses;
   a first end radius that connects the first outer wall and the second outer wall;
   a second end radius that connects the first outer wall and the second outer wall; and
   a multiple of septum elements that extend between the first outer wall and the second outer wall
   wherein the first outer wall, the second outer wall, the first end radius and the second end radius terminate with a transition section that forms a round interface section.

2. The septum-tied tube pack as recited in claim 1, wherein each of the multiple of septum elements extend tangentially with respect to the multiple of first connected radiuses and the multiple of second connected radiuses.

3. The septum-tied tube pack as recited in claim 2, wherein the multiple of septum elements are generally flat walls.

4. The septum-tied tube pack as recited in claim 3, wherein each of the multiple of septum elements includes at least one opening therethrough.

5. The septum-tied tube pack as recited in claim 3, wherein each of the multiple of septum elements is perforated.

6. The septum-tied tube pack as recited in claim 1, wherein the multiple of septum elements are maintained in tension when the septum-tied tube pack is under a positive pressure loads.

7. The septum-tied tube pack as recited in claim 1, wherein the first outer wall, the second outer wall, the first end radius, and the second end radius are maintained in tension when the septum-tied tube pack is under a positive pressure loads.

8. The septum-tied tube pack as recited in claim 1, wherein the multiple of septum elements are maintained in compression when the septum-tied tube pack is under a negative pressure load.

9. The septum-tied tube pack as recited in claim 1, wherein at least one of the first end radius and the second end radius form an outer passage that is generally "D" shaped in cross-section.

10. The septum-tied tube pack as recited in claim 9, wherein the outer passage forms a hemi-circle with a center located at a mid-point of an end septum element.

11. The septum-tied tube pack as recited in claim 10, wherein the first outer wall, the second outer wall and the multiple of septum elements define at least one inner passage that is racetrack shaped in cross section.

12. The septum-tied tube pack as recited in claim 11, further comprising an intermediate passage located between the outer passage and an adjacent inner passage, the intermediate passage defined between adjacent septum elements of the multiple of septum elements.

13. The septum-tied tube pack as recited in claim 12, wherein the intermediate passage has a width between the adjacent septum elements which define the intermediate passage and the at least one inner passage has a width between adjacent septum elements of the multiple of septum elements which define the at least one inner passage, and wherein the width of the intermediate passage is about one-half of the width of the at least one inner passage.

14. A gas turbine engine, comprising:
an engine case structure; and
a fluid conduit mounted to the engine case structure, the fluid conduit including a septum-tied tube pack section, the septum-tied tube pack section comprising:
 a first outer wall formed by a multiple of first connected radiuses;
 a second outer wall formed by a multiple of second connected radiuses;
 a first end radius that connects the first outer wall and the second outer wall;
 a second end radius that connects the first outer wall and the second outer wall; and
 a multiple of septum elements that extend between the first outer wall and the second outer wall
 wherein the first outer wall, the second outer wall, the first end radius and the second end radius terminate with a transition section that forms a round interface section.

15. The gas turbine engine as recited in claim 14, wherein the septum-tied tube pack section forms a tank.

16. The gas turbine engine as recited in claim 14, wherein the septum-tied tube pack section is located at a "pinch point".

17. The gas turbine engine as recited in claim 14, wherein the septum-tied tube pack section is additive manufactured.

* * * * *